United States Patent
Ellison et al.

(10) Patent No.: US 10,847,273 B2
(45) Date of Patent: Nov. 24, 2020

(54) STEAM SEPARATOR AND NUCLEAR BOILING WATER REACTOR INCLUDING THE SAME

(71) Applicants: Phillip Glen Ellison, Wilmington, NC (US); Adrian M. Mistreanu, Wilmington, NC (US); Bobby Glen Malone, Wilmington, NC (US); John S. Bennion, Wilmington, NC (US); Bulent Alpay, Wilmington, NC (US); Michael L. James, Wilmington, NC (US)

(72) Inventors: Phillip Glen Ellison, Wilmington, NC (US); Adrian M. Mistreanu, Wilmington, NC (US); Bobby Glen Malone, Wilmington, NC (US); John S. Bennion, Wilmington, NC (US); Bulent Alpay, Wilmington, NC (US); Michael L. James, Wilmington, NC (US)

(73) Assignee: GE-HITACHI NUCLEAR ENERGY AMERICAS LLC, Wilmington, NC (US)

(*) Notice: Subject to any disclaimer, the term of this patent is extended or adjusted under 35 U.S.C. 154(b) by 1153 days.

(21) Appl. No.: 14/157,966

(22) Filed: Jan. 17, 2014

(65) Prior Publication Data
US 2015/0206606 A1 Jul. 23, 2015

(51) Int. Cl.
*G21C 15/16* (2006.01)
*B01D 45/16* (2006.01)

(52) U.S. Cl.
CPC ............. *G21C 15/16* (2013.01); *B01D 45/16* (2013.01); *Y02E 30/31* (2013.01)

(58) Field of Classification Search
CPC .......... G21C 9/00; G21C 15/16; B01D 45/00; B01D 45/16; B05D 7/22
(Continued)

(56) References Cited

U.S. PATENT DOCUMENTS 3,961,923 A    6/1976  Zia Rouhani
4,783,204 A *  11/1988 Roarty ................... B01D 45/16
                                                              122/34

(Continued)

FOREIGN PATENT DOCUMENTS

EP    0555081 A1    8/1993
EP    0859368 A1    8/1998
(Continued)

OTHER PUBLICATIONS

Unofficial English translation of Office Action issued in connection with corresponding ES Application No. 201431931 dated May 11, 2015.
(Continued)

*Primary Examiner* — Jack W Keith
*Assistant Examiner* — Daniel Wasil
(74) *Attorney, Agent, or Firm* — Harness, Dickey & Pierce, P.L.C.

(57) ABSTRACT

A steam separation system includes a standpipe configured to receive a gas-liquid two-phase flow stream and a diffuser configured to receive the gas-liquid two-phase flow stream from the standpipe. The diffuser includes a swirler configured to separate the gas-liquid two-phase flow stream. The swirler includes a plurality of swirler vanes and a straightener structure. The straightener structure includes a hub. The plurality of swirler vanes is mounted radially around the hub, and a straightener extends in an upward direction from the hub. The system also includes a separation barrel configured to receive the gas-liquid two-phase flow stream from (Continued)

the swirler. The separation barrel includes a rifled channel having orifices along an inner surface thereof. The plurality of swirler vanes is tuned with the rifled channel, such that an angle of each of the plurality of vanes corresponds to an angle of the rifled channel.

17 Claims, 4 Drawing Sheets

(58) Field of Classification Search
USPC .......................................................... 376/371
See application file for complete search history.

(56) References Cited

U.S. PATENT DOCUMENTS

| | | | |
|---|---|---|---|
| 5,147,597 A | 9/1992 | Roofthooft et al. | |
| 5,444,747 A | 8/1995 | Terhune | |
| 5,715,290 A | 2/1998 | Uetake et al. | |
| 5,963,611 A * | 10/1999 | Narabayashi | B01D 53/24 376/371 |
| 2002/0101952 A1 | 8/2002 | Dulka et al. | |
| 2005/0265512 A1 | 12/2005 | Dulka et al. | |
| 2007/0003001 A1 | 1/2007 | Dulka et al. | |
| 2007/0201604 A1* | 8/2007 | Chaki | B01D 45/16 376/301 |
| 2008/0250765 A1* | 10/2008 | Lane | B01D 45/06 55/495 |
| 2010/0055308 A1* | 3/2010 | Dulka | C09D 5/1618 427/237 |
| 2012/0117928 A1* | 5/2012 | Kondo | B01D 45/14 55/442 |

FOREIGN PATENT DOCUMENTS

| | | |
|---|---|---|
| EP | 2560173 A1 | 2/2013 |
| JP | 5651219 A | 5/1981 |
| JP | S6061185 A | 4/1985 |
| JP | 06174206 A | 6/1994 |
| JP | H10153682 A | 6/1998 |
| JP | 11137935 A | 5/1999 |
| JP | 2000329889 A | 11/2000 |
| JP | 2001083276 A | 3/2001 |
| JP | 2001174582 A | 6/2001 |
| JP | 2001183489 A | 7/2001 |
| JP | 2002207094 A | 7/2002 |
| JP | 2004099961 A | 4/2004 |
| JP | 2004205302 A | 7/2004 |
| JP | 2004245656 A | 9/2004 |
| JP | 2004333468 A | 11/2004 |
| JP | 2006194873 A | 7/2006 |
| JP | 2006242577 A | 9/2006 |
| JP | 2007229755 A | 9/2007 |
| JP | 2010261821 A | 11/2010 |
| JP | 2011191080 A | 9/2011 |
| JP | 2012058113 A | 3/2012 |
| JP | 2012117917 A | 6/2012 |
| JP | 2012154654 A | 8/2012 |
| JP | 2013003083 A | 1/2013 |
| WO | 9846328 A1 | 10/1998 |
| WO | 02090008 A1 | 11/2002 |

OTHER PUBLICATIONS

Unofficial English Translation of Japanese Office Action issued in connection with Related JP Application No. 2009-192674 dated Oct. 29, 2013.

Unofficial English Translation of Taiwan Office Action issued in connection with Related TW Application No. 98128406 dated Feb. 19, 2014.

Finnish Office Action issued in connection with Related FI Application No. 20095853 dated Oct. 31, 2014.

Swedish Office Action issued in connection with corresponding SE Application No. 1550024-2 dated Dec. 20, 2016.

* cited by examiner

STEAM SEPARATOR AND NUCLEAR BOILING WATER REACTOR INCLUDING THE SAME

BACKGROUND

Field

Example embodiments relate to a steam separation system for a nuclear boiling water reactor and/or a nuclear boiling water reactor including the same.

Description of Related Art

A boiling water nuclear reactor generates steam by utilizing heat generated from a core and rotates a turbine and a power generator by means of the steam. In a pressurized water nuclear reactor, cooling water separately flows into a primary cooling system circulating through the nuclear reactor, and a secondary cooling system serving as a steam generator. In the primary cooling system, high-temperature water is generated by the heat generated from the nuclear reactor core. In the secondary cooling system, water in the secondary cooling system is boiled in a heat exchanger in the steam generator to become steam, which rotates a turbine or a power generator.

Regardless of the reactor type, moisture must be removed from the steam to be supplied to the turbine. To this end, a typical reactor is provided with a plurality of steam separators, dryers and the like so as to remove water from a two-phase flow of steam and water generated in the nuclear reactor or the steam generator.

In a conventional steam separator, even if the water separated from the two-phase flow that has flowed in the steam separator is discharged outside the barrel through the water discharge pipe, most of the steam flows out from the upper part of the barrel. Therefore, if the two-phase flow stream (FS) velocity is high and/or steam separator inlet moisture content is high, the number of the minute droplets that are carried by the steam is increased, which may result in an increase in moisture carry-over. The increase in moisture carry-over increases the radioactivity levels in the plant and adversely affects outage performance. If the moisture carry-over levels become undesirably high, certain components of the main steam line and turbine can be adversely impacted as a result of enhanced degradation from such mechanisms such as flow accelerated corrosion leading to higher maintenance costs.

SUMMARY

Example embodiments relate to a steam separation system and/or a nuclear boiling water reactor including the same. In particular, example embodiments are directed to a multi-zone steam separation system and/or a nuclear boiling water reactor including the same.

In accordance with an example embodiment, a steam separation system includes a standpipe configured to receive a gas-liquid two-phase flow stream, a first diffuser configured to receive the gas-liquid two-phase flow stream from the standpipe, the first diffuser including a swirler configured to separate the gas-liquid two-phase flow stream, and a separation barrel configured to receive the gas-liquid two-phase flow stream from the swirler, the separation barrel including a rifled channel having orifices along an inner surface thereof.

In accordance with another example embodiment, a nuclear boiling water reactor includes a reactor pressure vessel, a core in the reactor pressure vessel, and a plurality of steam separation systems according to an example embodiment, the plurality of steam separation systems arranged above the core in the reactor pressure vessel.

BRIEF DESCRIPTION OF THE DRAWINGS

The various features and advantages of non-limiting example embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
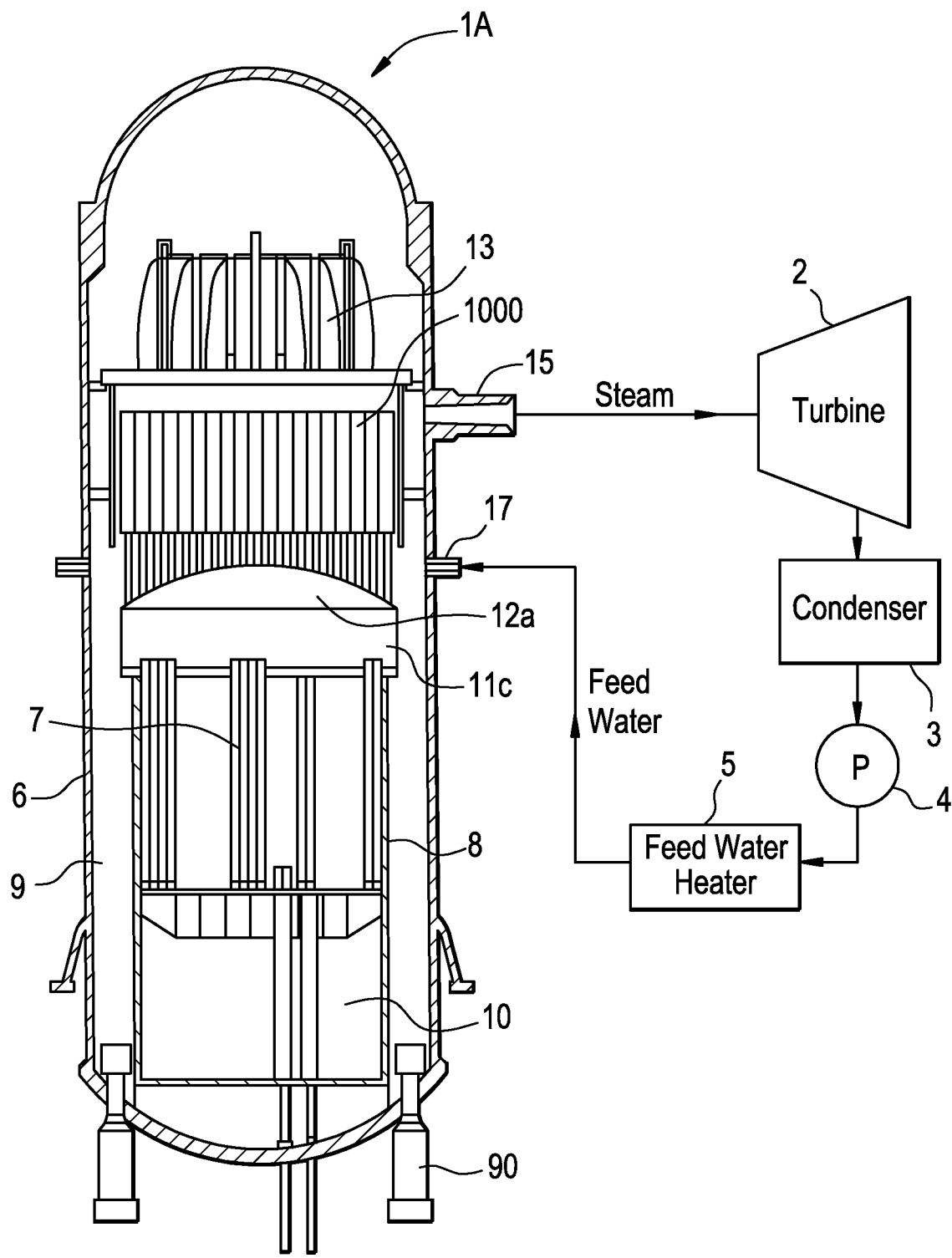
FIG. 1 is a cross-sectional view of a nuclear boiling water reactor according to an example embodiment.

It should be understood that when an element is referred to as being "on," "connected to," "coupled to," or "covering" another element, it may be directly on, connected to, coupled to, or covering the other element or intervening elements that may be present. In contrast, when an element is referred to as being "directly on," "directly connected to," or "directly coupled to" another element, there are no intervening elements present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a cross-sectional view of a nuclear boiling water reactor (BWR) according to an example embodiment. In the nuclear BWR 1A, a plurality of steam separators 1000 having the structure described below are located at the upper portion of the reactor pressure vessel 6. The following is a description of the structure inside the pressure vessel 6.

A cylindrical core shroud 8, which is concentric with the pressure vessel 6, is installed at a lower portion in the pressure vessel 6. A core lower plenum 10 is formed under the shroud 8 in the pressure vessel 6. A core 7 is disposed above this upper plenum 10 and surrounded by the shroud 8. The core 7 includes nuclear fuel, which generates heat turning the light water of the reactor into steam. There is also a core upper plenum 11c above the core 7. A shroud head 12a is disposed above the upper plenum 11c. It is to be noted that an annular space 9 is formed between the pressure vessel 6 and the shroud 8, and this functions as a circulation path for the light water.

A prescribed number of holes (not shown) through which the coolant passes are provided in the shroud head 12a. The plurality of steam separators 1000 are inserted into these holes and are aligned in parallel. The flow paths which join the core 7 and the steam separator 1000 are connected via the upper plenum 11c. Also, a steam dryer 13 is provided above the steam separators 1000. A feedwater inlet nozzle 17 and a steam outlet nozzle 15 are provided at the side wall of the pressure vessel 6. Internal pumps 90 are provided at the lower portion of the reactor pressure vessel 6.

In the nuclear BWR 1A, the steam generated in the core 7 flows in each of the steam separators 1000 mounted on the shroud head 12a via the upper plenum 11c as a gas-liquid two-phase flow including the light water. In the steam separators 1000, the introduced gas-liquid two-phase flow stream passes through in an upward direction.

The steam separators 1000 supply steam containing moisture that could not be removed to the steam dryer 13 positioned above the steam separators 1000.

The steam (saturated steam) from which moisture is further removed by the steam dryer 13 is exhausted from the steam outlet nozzle 15 and supplied to the turbine 2. This steam drives the turbine 2, which rotates a generator (not shown) joined to the turbine 2, and thereby power is generated. The steam exhausted from the turbine 2 is condensed at the condenser 3 and becomes condensed water. The condensed water, that is, the cooling water (light water) is supplied to a feedwater heater 5 by a feedwater pump 4. The cooling water heated by the feedwater heater 5 is introduced to the pressure vessel 6 from the feedwater nozzle 17.

Meanwhile, the water separated by the steam separator 1000 is mixed with the cooling water supplied from the feedwater inlet nozzle 17 and descends the annular space 9 and is introduced to the core 7 via the lower plenum 10. At this time, the cooling water supplied to the core 7 is pressurized by the internal pump 90.

Figure 2:
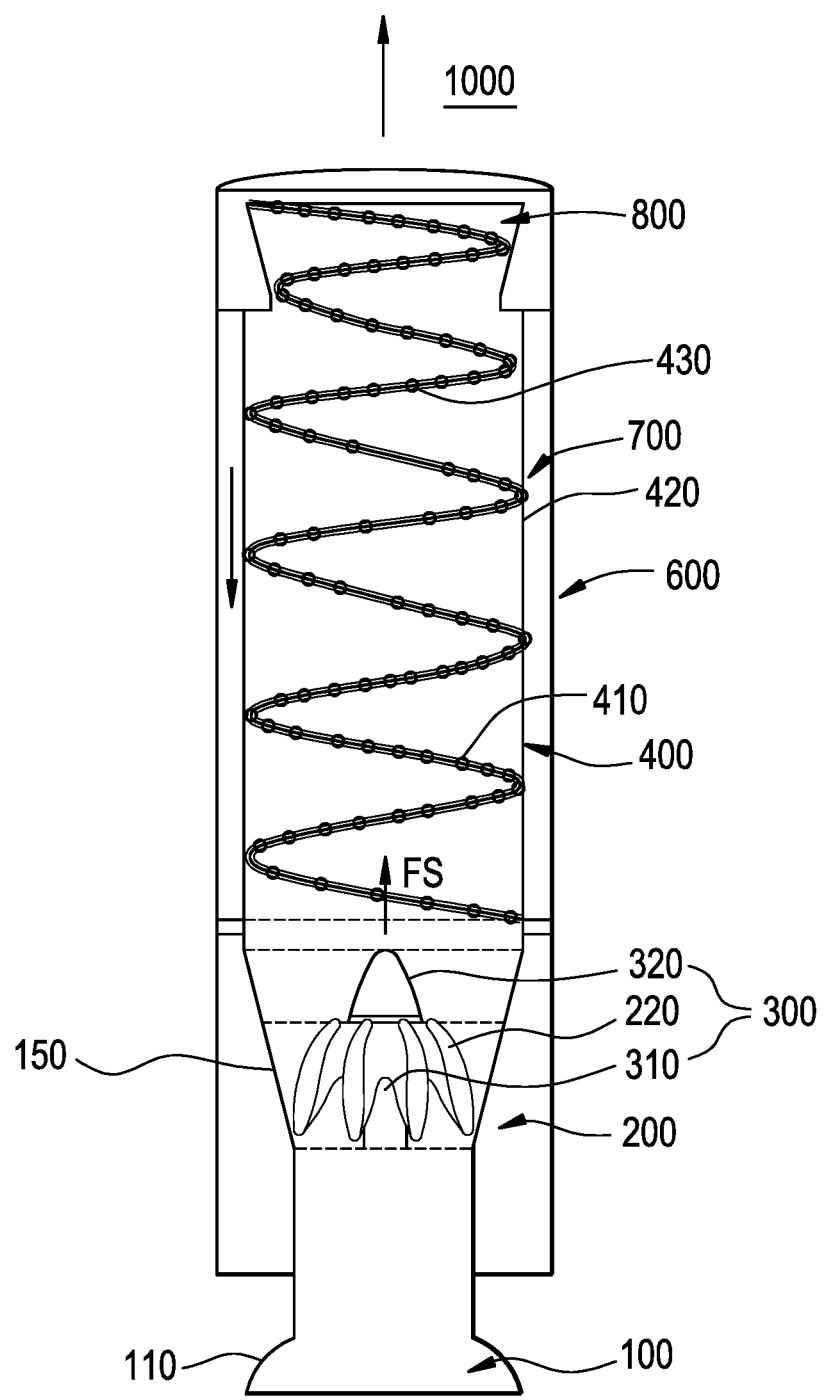
FIG. 2 is a longitudinal cross-sectional view of one of the steam separators 1000 according to an example embodiment.

FIG. 2 is a longitudinal cross-sectional view of one of the steam separators 1000 according to an example embodiment. It will be appreciated that each of, or some of, the plurality of steam separators 1000 may have the structure shown in FIG. 2.

In an example embodiment, the steam separator 1000 includes a standpipe 100, a first diffuser 150, a swirler 200 including a plurality of vanes 220, a straightener structure 300, a separation barrel 400, a skirt 600, a drain channel 700 and a second diffuser 800.

The standpipe 100 is configured to introduce a gas-liquid two-phase flow stream (FS), which is indicated by the arrow in FIG. 2. The gas of the gas-liquid two-phase FS may be steam, and the liquid of the gas-liquid two-phase FS may be water.

The inlet 110 of the standpipe 100 has a bellmouth shape, and the standpipe 100 has a cylindrical shape therebetween. The bellmouth shape of the inlet 110 mitigates or prevents a drop in pressure of the gas-liquid two-phase FS. The bellmouth shape of the inlet 110 has a variable curvature radii, which may be tuned to boundary conditions of the gas-liquid two-phase FS (e.g., flow, pressure and steam quality). The bellmouth shape of the inlet 110 may be modified based on characteristics of the gas-liquid two-phase FS entering the standpipe 100.

The standpipe 100 may be coated with a material that contributes to the mitigation or prevention of a drop in pressure of the gas-liquid two-phase FS. The coating material may be $TiO_2$, which is described in U.S. Patent Publication No. 2010/0055308, the entire contents of which are incorporated herein by reference.

The first diffuser 150 connects to the upper end surface of the standpipe 100 and forms a flow path. For example, the first diffuser 150 is welded to the standpipe 100. The interior of the first diffuser 150 is equipped with a swirler 200 and a straightener structure 300. The swirler 200 includes a plurality of swirler vanes 220 which are mounted radially around a hub 310 of the straightener structure 300. The straightener structure 300 is an integral structure that includes the hub 310, and a straightener 320 extending in an upward direction from the hub 310. The hub 310 has a cylindrical shape and the straightener 320 is at an upper surface of the hub and may be cone-shaped. However, example embodiments are not limited thereto.

The outer edge of each of the plurality of swirler vanes 220 is connected to the inner surface of the first diffuser 150.

As a result, the plurality of swirler vanes 220 form the flow path in the space formed by the inner surface of the first diffuser 150, the straightener structure 300 and the plurality of swirler vanes 220.

Figure 3A:
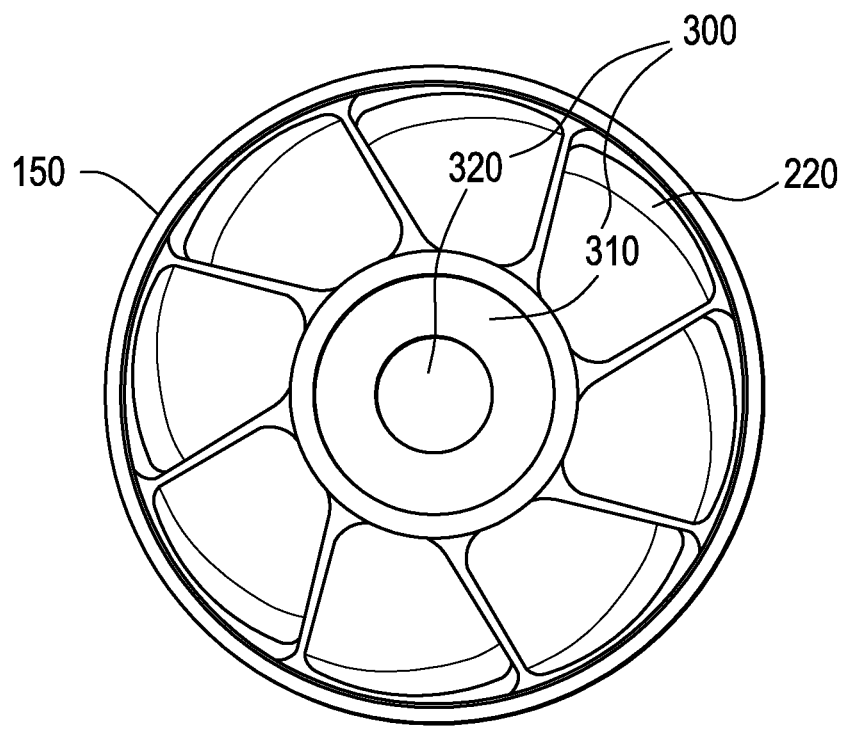
FIG. 3A is a top view of an example embodiment of a swirler and straightener structure of the steam separator of FIG. 2.
Figure 3B:
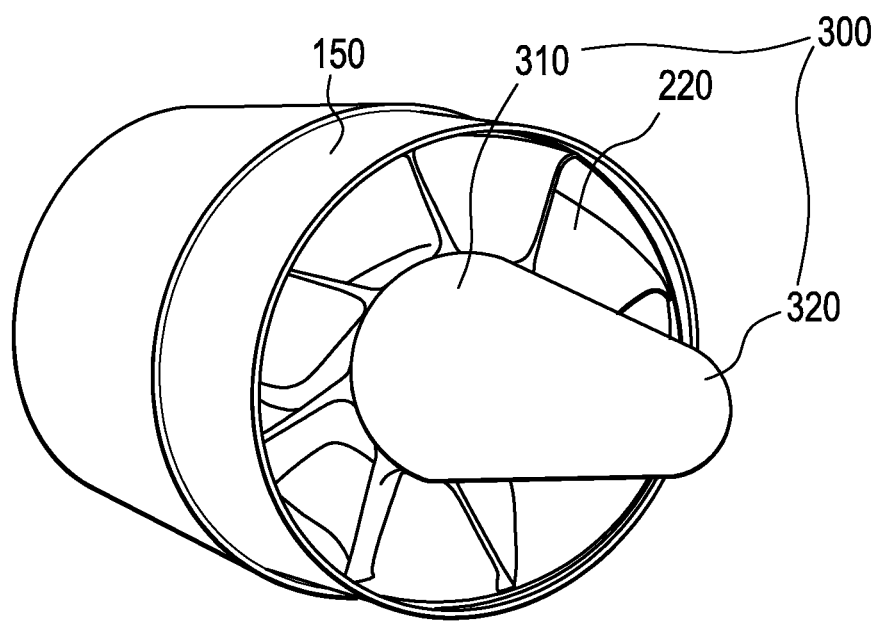
FIG. 3B is a perspective view of an example embodiment of a swirler and straightener structure of the steam separator of FIG. 2.

FIG. 3A is a top view of an example embodiment of a swirler and straightener structure of the steam separator of FIG. 2, and FIG. 3B is a perspective view of an example embodiment of a swirler and straightener structure of the steam separator of FIG. 2.

In FIGS. 3A-3B, a plurality of swirler vanes 220 are mounted radially around the hub 310, and the outer edges of the plurality of swirler vanes 220 are connected to the inner surface of the first diffuser 150. Here, eight swirler vanes 220 are shown, but example embodiments are not limited thereto. The straightener structure 300 may prevent or inhibit the gas-liquid two-phase FS from forming a vortex as the gas-liquid two-phase FS flows across the plurality of swirler vanes 220. The straightener structure 300 including the hub 310 and the straightener 320 is disposed on the center axis portion of the first diffuser 150. After the swirler 200 and straightener structure 300 are assembled separately, they can be attached together.

The swirler 200 is configured to receive the gas-liquid two-phase FS from the standpipe 100 and separate the liquid of the gas-liquid two-phase FS. The swirler 200 separates the gas-liquid two-phase FS at the axial center vicinity of the first diffuser 150 into steam with a relatively small drop in pressure.

The plurality of swirler vanes 220 are tuned to a rifled channel 410 of the separation barrel 400 which will be described later. For example, the angle of the plurality of swirler vanes 220 is designed to correspond with the angle of the rifled channel 410 of the separation barrel 400 such that the system has a minimum or reduced drop in pressure and maximum or increased separating efficiency (reduced carry-over).

A shape of the plurality of swirler vanes 220 may be modified based on characteristics of the gas-liquid two-phase FS at the entrance to the standpipe 100 (steam-moisture content, flow distribution based on the position of the steam separation system in the BWR and the flow direction in relation to the shroud head 12a (see FIG. 1)).

The straightener 320 extends in an upward direction from the hub 310 of the swirler 200 within the first diffuser 150. The straightener 320 is configured to receive the gas-liquid two-phase FS from the swirler 200, and to direct the gas of the gas-liquid two-phase FS to the axial center vicinity of the first diffuser 150. By directing the gas towards the center of the first diffuser 150, the straightener 320 mitigates or prevents the drop in pressure of the gas-liquid two-phase FS while enhancing moisture separation.

Returning to FIG. 2, the separation barrel 400 connects to the upper end surface of the first diffuser 150 and forms a flow path. For example, the separation barrel 400 is welded to the first diffuser 150. The separation barrel 400 is configured to receive the gas-liquid two-phase FS from the straightener 320. A skirt 600 forms an annular space which encloses the first diffuser 150 and separation barrel 400 so as to be concentric therewith and define a space therebetween referred to as the drain channel 700. The space between includes the drain channel 700 which will be described in detail later.

Inner walls 420 of the separation barrel 400 may be coated with an anti-fouling agent in order to minimize or reduce a loss in surface friction. The anti-fouling agent may be $TiO_2$, which is described in U.S. Patent Publication No. 2010/0055308, the contents of which are incorporated herein by reference.

The separation barrel 400 includes a rifled channel 410, a skirt 600, and a drain channel 700. The rifled channel 410 forms a rifled twist shape on inner walls 420 of the separation barrel 400. The rifled channel 410 is tuned with the plurality of swirler vanes 220. The rifled channel 410 separates the liquid from the gas-liquid two-phase FS and directs the liquid to the drain channel 700, thereby minimizing or reducing the re-entrainment of the separated liquid.

The gas-liquid two-phase FS flows through the separation barrel 400 contacting the rifled channel 410 having the rifled twist shape on the inner walls 420 of the separation barrel, separates the liquid contacting the inner walls 420 from the gas-liquid two-phase FS and directs the liquid to the drain channel 700. The swirler 200 centrifugally separates the liquid from the gas-liquid two-phase FS into droplets that attach to the inner walls 420 of the separation barrel 400 and the gas in the gas-liquid two-phase FS flows to the center of the separation barrel 400.

The rifled channel 410 on the inner walls 420 of the separation barrel 400 enhances the separating capability on and near the surface of the separation barrel 400 and also enhances the drainage capability of the separation barrel 400 while mitigating or preventing a loss in pressure. The rifled channel 410 will reduce the amount of swirl that needs to be imposed at the inlet 110 of the steam separator 1000, thereby mitigating or preventing a loss in pressure.

A series of orifices 430 on the rifled channel 410 will collect liquid from the gas-liquid two-phase FS and redirect it to the drain channel 700. A greater amount of orifices 430 are located in the portion of the rifled channel 410 closest to the standpipe 100 in order to control the drainage capacity. The shape of the orifices 430 is tuned to the location on the rifled channel 410.

The separated liquid of the gas-liquid two-phase FS is picked up by orifices in the rifled channel 410, and flows down through the drain channel 700. The rifled channel 410 obstructs the drain channel 700, and therefore accelerates the separation of the liquid from the gas-liquid two-phase FS. The pressure drop in the separation barrel 400 creates suction in the space between the separation barrel 400 and the drain channel 700 which is then applied to the gas-liquid two-phase FS prior to the gas-liquid two-phase FS entering the drain channel 700.

Figure 4:
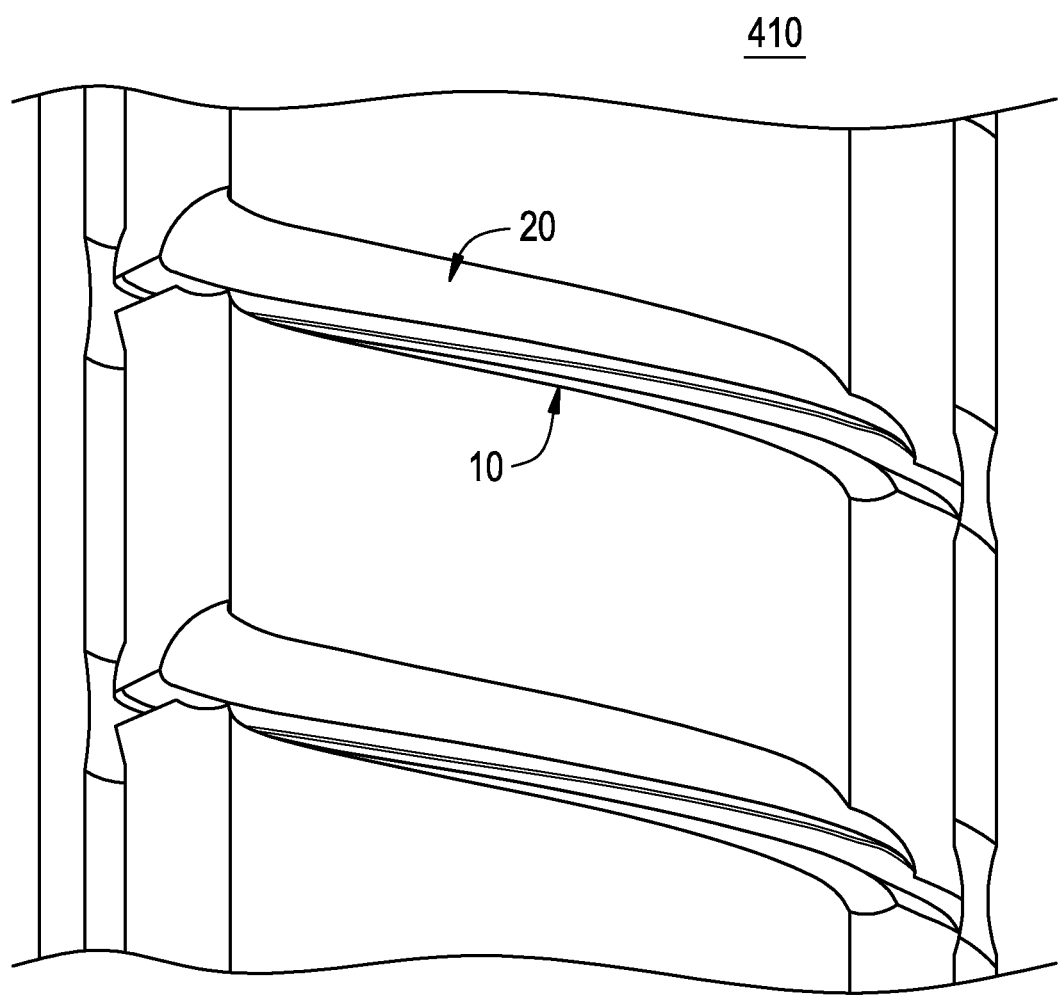
FIG. 4 is an enlarged cross-sectional view of an example embodiment of a rifled channel of the separation barrel of FIG. 2.

A further description of the rifled channel 410 will be made with reference to FIG. 4. FIG. 4 is an enlarged cross-sectional view of a rifled channel of the separation barrel of FIG. 2.

In FIG. 4, the rifled twist shape of the rifled channel 410 includes a lower portion 10 that has a variable pitch tuned with the plurality of swirler vanes 220, and an upper portion 20 also having a variable pitch corresponding with the lower portion 10. As the gas-liquid two-phase FS travels upward, the amount of separated liquid of the gas-liquid two-phase FS diminishes. Therefore, a smaller or greater amount of twist may be required in the upper portion 20 of the rifled channel 410 compared with the lower portion 10 in order to mitigate or prevent a loss in pressure (i.e., variable pitch). The liquid collected from the gas-liquid two-phase FS in the rifled channel 410 is collected by the orifices 430 and enters the drain channel 700.

Returning to FIG. 2, a second diffuser 800 connects to the upper end surface of the separation barrel 400 and forms a flow path. For example, the second diffuser 800 is welded to the separation barrel 400. The second diffuser 800 allows for mixing of the gas-liquid two-phase FS exiting the separation barrel 400. The second diffuser 800 may be shaped such that the exit is wider than the entrance thereto, and the height and angle of sidewalls of the second diffuser may vary depending on the arrangement of the second diffuser 800 within the steam separator 1000.

All steam separator components may be made of materials that are known to be acceptable for a nuclear environment. For instance, stainless steel (304, 316, XM-19, or equivalent) may be used.

Example embodiments thus being described, it will be appreciated by one skilled in the art that example embodiments may be varied through routine experimentation and without further inventive activity. Variations are not to be regarded as a departure from the spirit and scope of the example embodiments, and all such modifications as would be obvious to one skilled in the art are intended to be included within the scope of the following claims.

The invention claimed is:

1. A steam separation system comprising:
    a standpipe configured to receive a gas-liquid two-phase flow stream;
    a diffuser configured to receive the gas-liquid two-phase flow stream from the standpipe, the diffuser including a swirler configured to separate the gas-liquid two-phase flow stream, the swirler including,
        a plurality of swirler vanes, and
        a straightener structure including,
            a hub, the plurality of swirler vanes mounted radially around the hub, and
            a straightener extending in an upward direction from the hub; and
    a separation barrel configured to receive the gas-liquid two-phase flow stream from the swirler, the separation barrel including a rifled channel having orifices along an inner surface thereof, the plurality of swirler vanes being tuned with the rifled channel, such that an angle of each of the plurality of vanes corresponds to an angle of the rifled channel, and the straightener structure is configured to direct the gas of the gas-liquid two-phase flow stream towards a center of the separation barrel.

2. The steam separation system of claim 1, wherein the orifices of the rifled channel are configured to collect the liquid of the gas-liquid two-phase flow stream.

3. The steam separation system of claim 1, wherein the rifled channel of the separation barrel has a variable pitch.

4. The steam separation system of claim 1, wherein the straightener is cone-shaped, and the hub has a cylindrical shape.

5. The steam separation system of claim 1, wherein the inner surface of the separation barrel and an inner surface of the standpipe are coated with an anti-fouling agent.

6. The steam separation system of claim 5, wherein the anti-fouling agent includes $TiO_2$.

7. The steam separation system of claim 1, wherein the standpipe includes an inlet having a bellmouth shape.

8. The steam separation system of claim 1, wherein the diffuser is a first diffuser and the system further comprises:
    a second diffuser connected to the separation barrel, the second diffuser configured to mix the gas-liquid two-phase flow stream exiting the separation barrel.

9. The steam separation system of claim 1, further comprising:
    a drain channel configured to receive the gas-liquid two-phase flow stream from the separation barrel, the drain channel configured to apply suction to the gas-liquid two-phase flow stream prior to the gas-liquid two-phase flow stream entering the orifices of the drain channel.

10. The steam separator of claim 1, wherein the orifices are located only in the rifled channel.

11. A nuclear boiling water reactor comprising:
    a reactor pressure vessel;
    a core in the reactor pressure vessel; and
    a plurality of steam separation systems according to claim 1, the plurality of steam separation systems arranged above the core in the reactor pressure vessel.

12. The nuclear boiling water reactor of claim 11, wherein the orifices of the rifled channel are configured to collect the liquid of the gas-liquid two-phase flow stream.

13. The nuclear boiling water reactor of claim 11, wherein the rifled channel of the separation barrel has a variable pitch.

14. The nuclear boiling water reactor of claim 11, wherein the straightener is cone-shaped, and the hub has a cylindrical shape.

15. The nuclear boiling water reactor of claim 11, wherein the inner surface of the separation barrel and an inner surface of the standpipe are coated with an anti-fouling agent.

16. The nuclear boiling water reactor of claim 15, wherein the anti-fouling agent includes $TiO_2$.

17. The nuclear boiling water reactor of claim 11, wherein the standpipe includes an inlet having a bellmouth shape.

* * * * *